(12) United States Patent
Jaranson et al.

(10) Patent No.: US 8,590,978 B2
(45) Date of Patent: Nov. 26, 2013

(54) ULTRA-THIN SEAT CARRIER

(75) Inventors: John W. Jaranson, Dearborn, MI (US); Marcos S. Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 472 days.

(21) Appl. No.: 12/882,791

(22) Filed: Sep. 15, 2010

(65) Prior Publication Data

US 2012/0061988 A1 Mar. 15, 2012

(51) Int. Cl.
*A47C 7/02* (2006.01)
*A47C 31/00* (2006.01)
*A47C 7/14* (2006.01)

(52) U.S. Cl.
USPC ............ 297/452.15; 297/218.1; 297/284.9; 297/452.14; 297/452.46; 297/452.56

(58) Field of Classification Search
USPC .......... 297/452.12, 452.14, 452.15, 452.19, 297/452.46, 452.56, 284.9, 284.11, 440.22, 297/452.6, 218.1
See application file for complete search history.

(56) References Cited

U.S. PATENT DOCUMENTS

| | | | |
|---|---|---|---|
| 3,411,824 A * | 11/1968 | White et al. ............. | 297/452.56 |
| 3,669,498 A * | 6/1972 | Meyers et al. ............ | 297/452.53 |
| 4,418,958 A * | 12/1983 | Watkin ...................... | 297/452.15 |
| 4,660,887 A * | 4/1987 | Fleming et al. .......... | 297/452.15 |
| 4,711,497 A * | 12/1987 | Kazaoka et al. ......... | 297/452.54 |
| 4,715,651 A * | 12/1987 | Wakamatsu ............... | 297/218.1 |
| 4,856,846 A * | 8/1989 | Lohmeyer ...................... | 297/285 |
| 4,892,356 A * | 1/1990 | Pittman et al. ............ | 297/452.15 |
| 5,015,038 A * | 5/1991 | Mrotz, III ................ | 297/452.15 |
| 5,102,196 A * | 4/1992 | Kaneda et al. ............ | 297/452.15 |
| 5,152,582 A * | 10/1992 | Magnuson ................. | 297/440.2 |
| 5,236,247 A | 8/1993 | Hewko | |
| 5,487,591 A * | 1/1996 | Knoblock ................ | 297/452.14 |
| 5,951,110 A * | 9/1999 | Conner et al. ........... | 297/452.31 |
| 6,409,268 B1 * | 6/2002 | Cvek ......................... | 297/452.15 |
| 6,626,497 B2 * | 9/2003 | Nagamitsu et al. ...... | 297/452.15 |
| 6,652,030 B2 * | 11/2003 | Conner et al. ................ | 297/333 |
| 7,032,971 B2 * | 4/2006 | Williams .................... | 297/284.4 |
| 7,607,738 B2 | 10/2009 | Gregory et al. | |
| 7,611,199 B2 * | 11/2009 | Michalak et al. ........ | 297/452.56 |
| 2008/0136240 A1 | 6/2008 | Matthews et al. | |

* cited by examiner

*Primary Examiner* — Sarah B McPartlin
*Assistant Examiner* — Tania Abraham
(74) *Attorney, Agent, or Firm* — Vichit Chea; Price Heneveld LLP

(57) ABSTRACT

A seating assembly having a seat and a seat back. A frame assembly is disposed in each of the seat and the seat back. A carrier assembly is operably coupled with the seat and the seat back. The carrier assembly includes a plurality of elongate support tabs proximate the seat. A plurality of apertures and at least one groove are proximate the seat back. A cushion extends over the seat and the seat back.

12 Claims, 7 Drawing Sheets

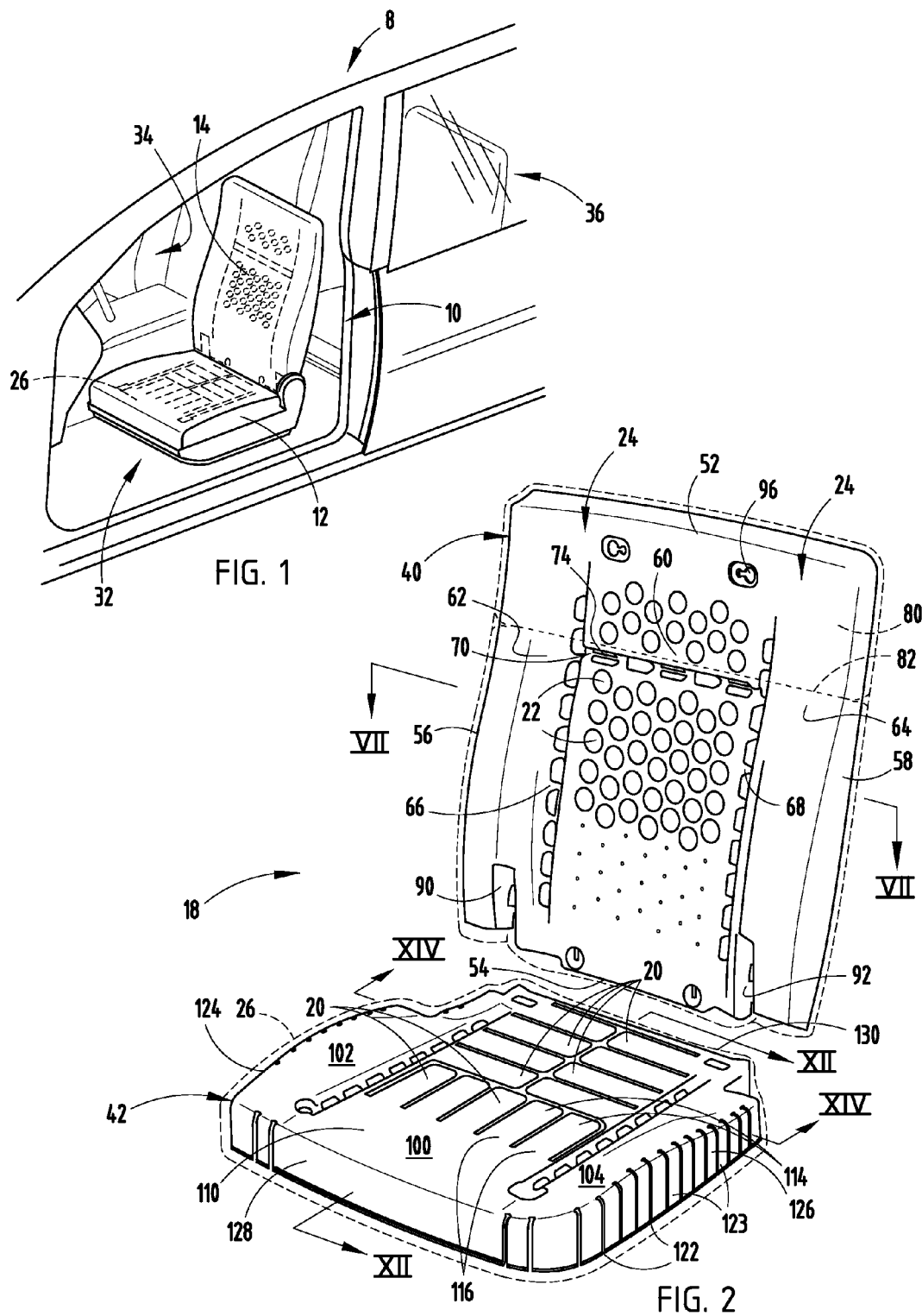

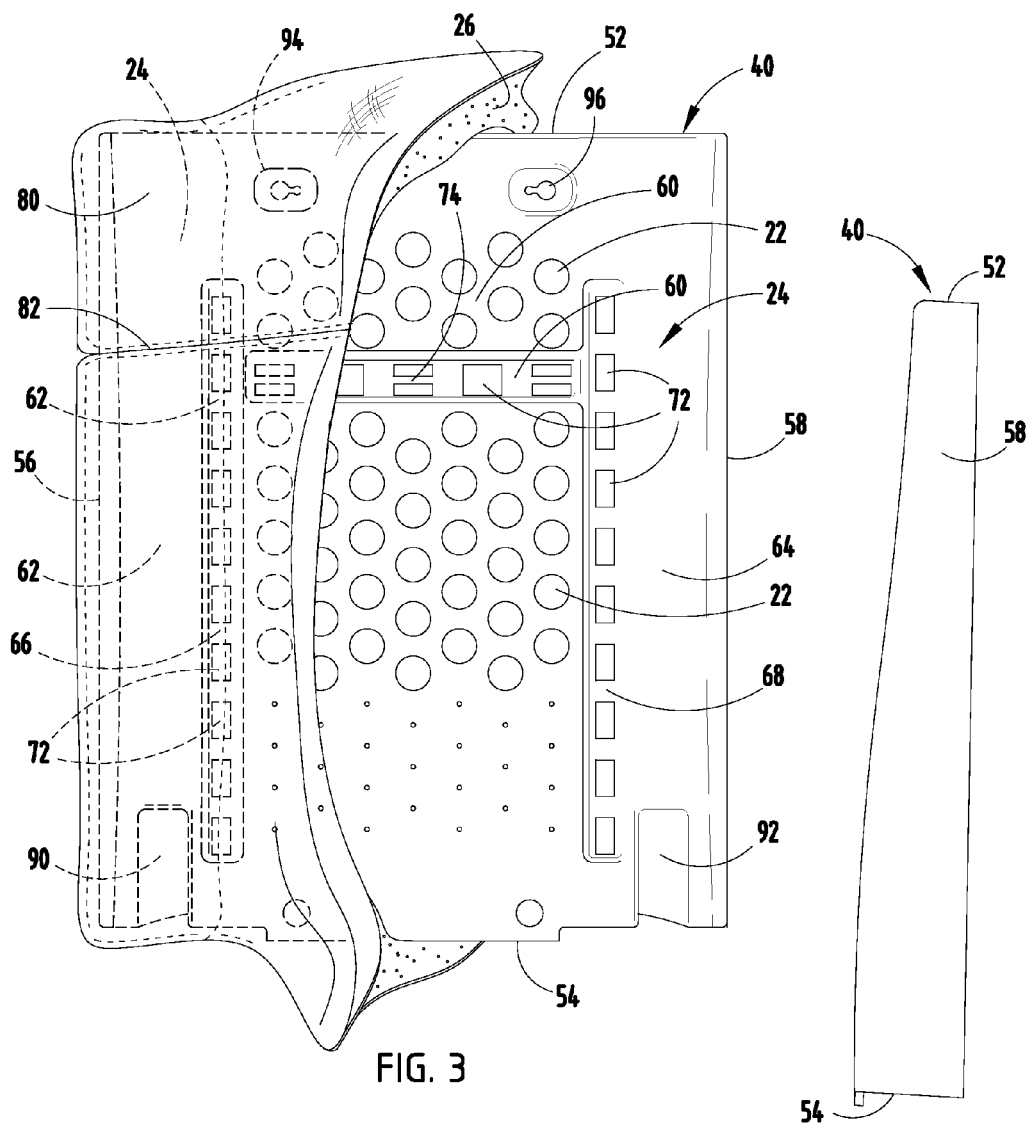
FIG. 3
FIG. 5
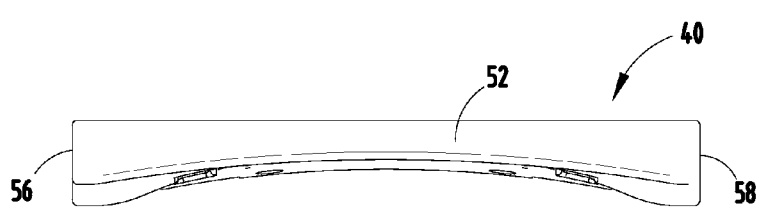
FIG. 4

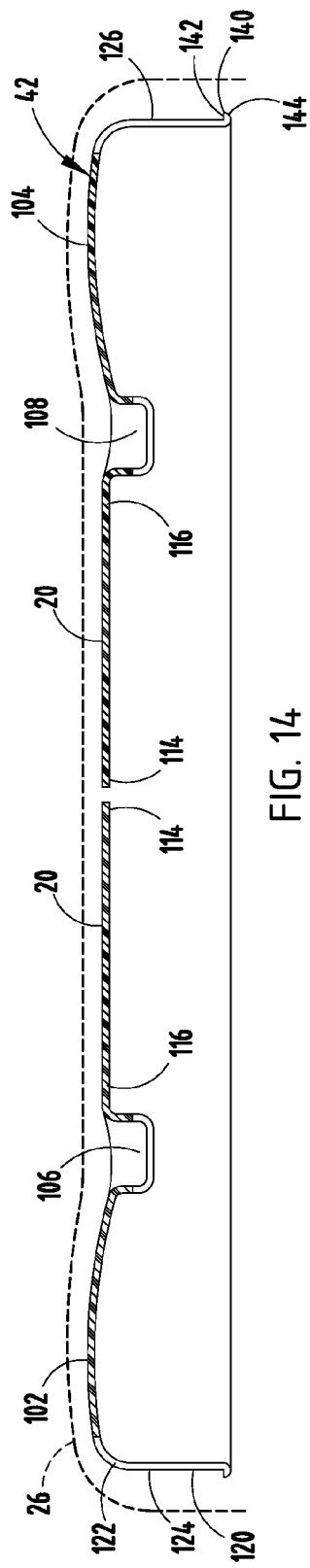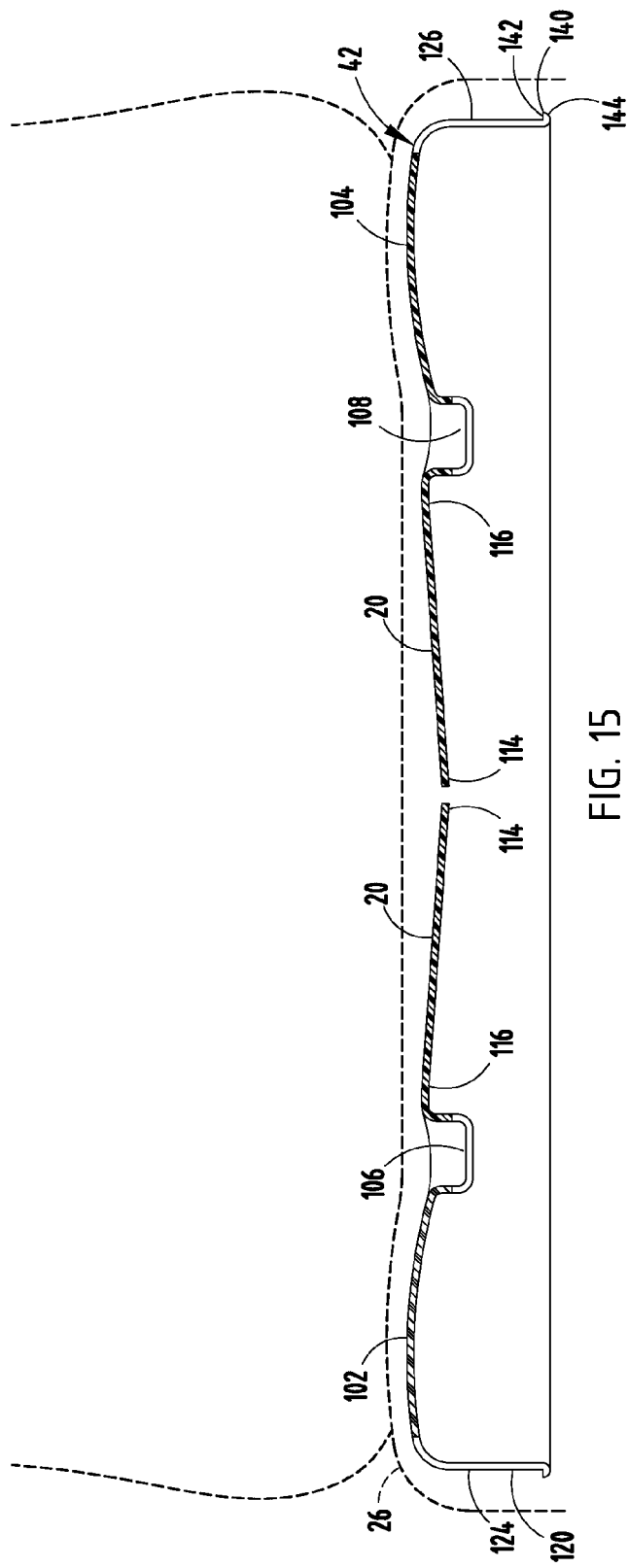

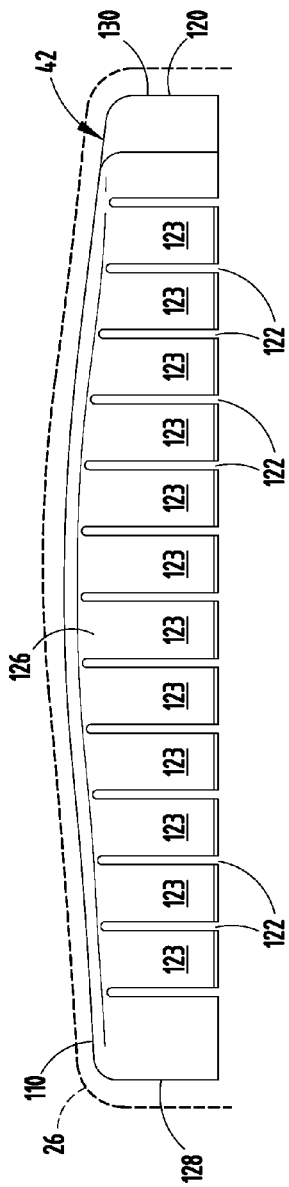
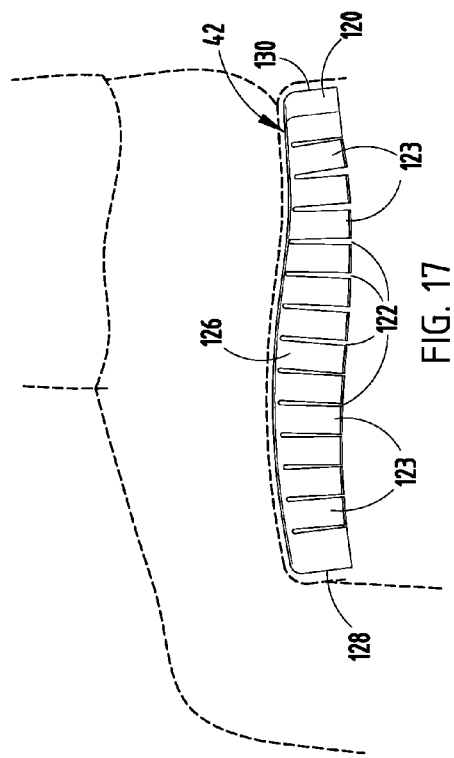
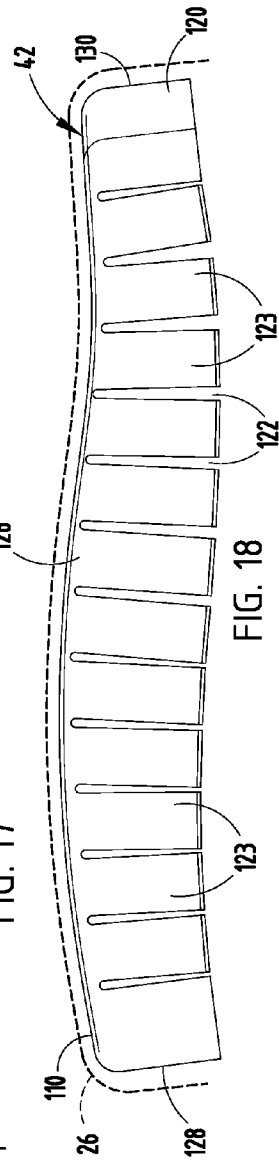
FIG. 16
FIG. 17
FIG. 18

ULTRA-THIN SEAT CARRIER

FIELD OF THE INVENTION

The present invention generally relates to an ultra-thin seat carrier, and more particularly relates to an ultra-thin seat carrier for use in a vehicle and which minimizes the overall thickness of the seat and seat back constructions.

BACKGROUND OF THE PRESENT INVENTION

Traditional vehicle seating has frequently included a seat frame that supports a matrix of springs that support a thick cushion thereon. These constructions are generally very thick and heavy, which result in decreased interior space in a vehicle, as well as loss of fuel efficiency as a result of the added weight of the seating system.

SUMMARY OF THE PRESENT INVENTION

One aspect of the present invention includes a seating assembly having a seat and a seat back. A frame assembly is disposed in each of the seat and the seat back. A carrier assembly is operably coupled with the seat and the seat back. The carrier assembly includes a plurality of elongate support tabs proximate the seat. A plurality of apertures and at least one groove are proximate the seat back. A cushion extends over the seat and the seat back.

Another aspect of the present invention includes a seating carrier assembly having a seat element. The seat element includes a support portion having a plurality of elongate flexible tabs and a rim portion. A plurality of rim slots are disposed in the rim portion. A seat back element includes vertical side channels and a lateral channel.

Yet another aspect of the present invention includes a seat back carrier having a body portion. The body portion includes first and second side portions. A first channel is defined between the first side portion and the body portion. A second channel is defined between the second side portion and the body portion. A lateral channel is integral with and extends across the body portion. The seat back carrier also includes a plurality of tuning stiffness apertures.

Yet another aspect of the present invention includes a seat carrier having a body portion. The body portion includes first and second side portions. A first channel is defined between the first side portion and the body portion. A second channel is defined between the second side portion and the body portion. A plurality of cushion tabs are disposed in and integral with the body portion. A plurality of edge stiffness tuning slots are disposed in the first and second side portions.

These and other aspects, objects, and features of the present invention will be understood and appreciated by those skilled in the art upon studying the following specification, claims, and appended drawings.

BRIEF DESCRIPTION OF THE DRAWINGS

FIG. 1 is a top perspective view of one embodiment of the seating assembly of the present invention installed in a vehicle;

FIG. 2 is a top perspective view of the seating assembly of FIG. 1 removed from the vehicle;

FIG. 3 is a front elevational view of one embodiment of a seat back carrier;

FIG. 4 is a top plan view of the seat back carrier of FIG. 3;

FIG. 5 is a side elevational view of the seat back carrier of FIG. 3;

FIG. 14 is a rear elevational view of the seat carrier taken at line XIV-XIV of FIG. 2;

FIG. 15 is a rear elevational view of the seat carrier of FIG. 14 with a distributed load representing the weight of a user placed across the seat carrier;

FIG. 16 is a side elevational view of the seat carrier of FIG. 8;

FIG. 17 is a side elevational view of the seat carrier of FIG. 8 with a distributed load representing the weight of a user placed on the seat carrier; and FIG. 18 is an enlarged view of the seat carrier of FIG. 17.

DETAILED DESCRIPTION OF EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
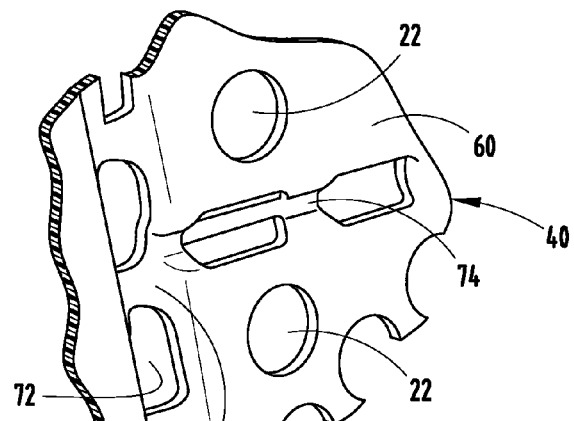
FIG. 6 is a top perspective view of a portion of a seat back carrier.
Figure 7:
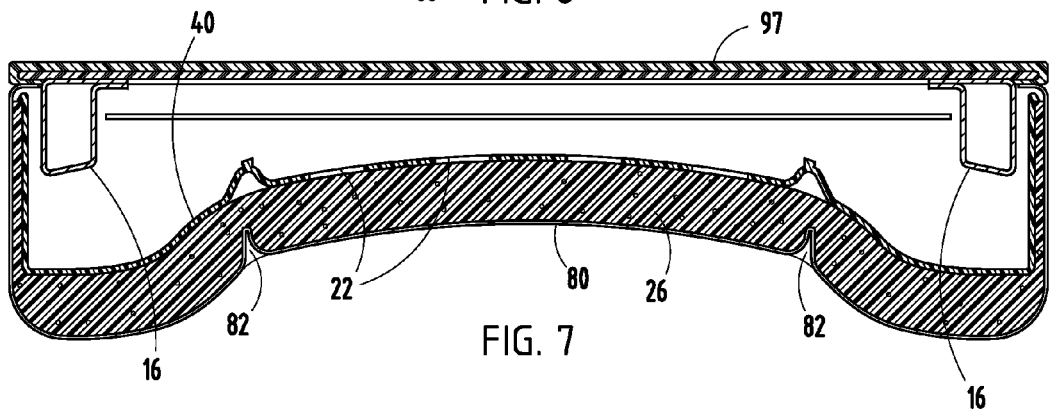
FIG. 7 is a top cross-sectional plan view of the seat back carrier taken at line V-V of FIG. 2.
Figure 8:
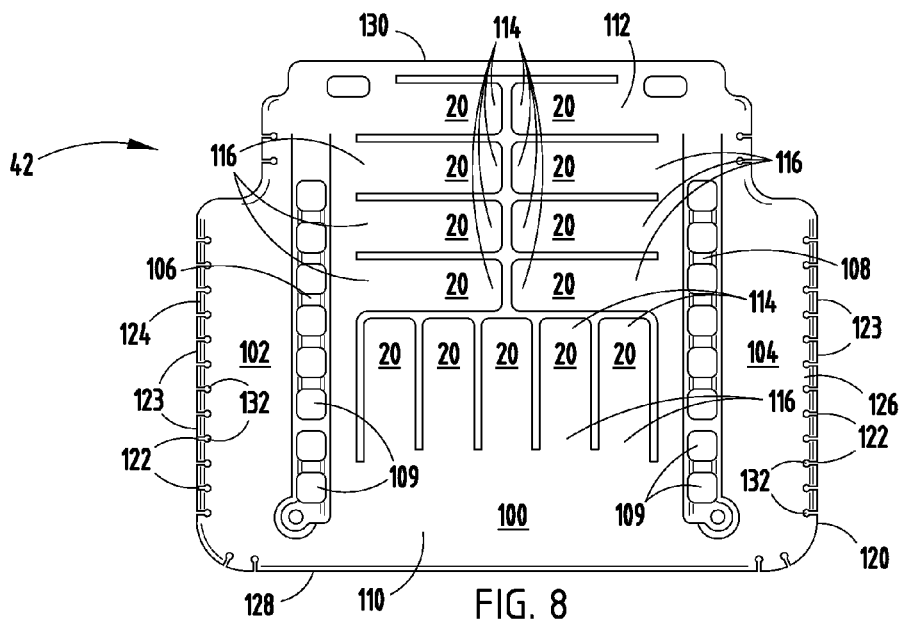
FIG. 8 is a top plan view of one embodiment of a seat carrier of the present invention.
Figure 9:
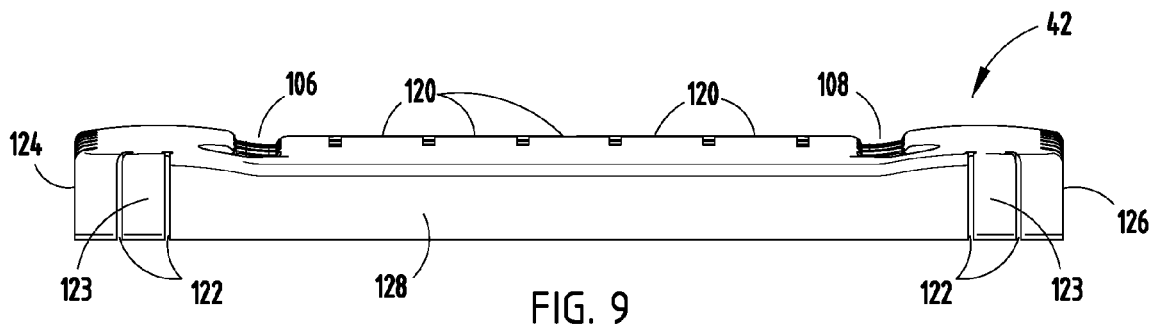
FIG. 9 is a front elevational view of the seat carrier of FIG. 8.
Figure 10:
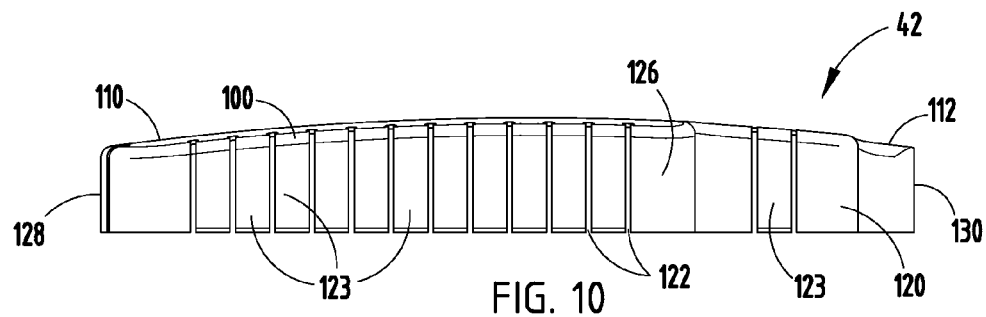
FIG. 10 is a side elevational view of the seat carrier of FIG. 8.

Referring now to FIGS. 1 and 2, the reference numeral 8 generally designates a vehicle having a seating assembly 10 with a seat 12 and a seat back 14. A frame assembly 16 (FIG. 7) is disposed in each of the seat 12 and the seat back 14. A carrier assembly 18 is operably coupled with the seat 12 and the seat back 14. The carrier assembly 18 includes a plurality of elongate support tabs 20 proximate the seat 12. A plurality of apertures 22 and at least one groove 24 are proximate the seat back 14. A cushion 26 extends over the seat 12 and the seat back 14.

Referring again to FIGS. 1 and 2, the seating assembly 10 is generally designed for use in the vehicle 8. It is contemplated that the seating assembly 10 may be used in a driver seat 32, passenger seat 34, or in a rear seat 36 of the vehicle 8. The seating assembly 10 is generally designed for use with the cushion 26 and also may be utilized in combination with manual or automatic seat movement systems that provide adjustability to the seat 12 in the vehicle 8. The carrier assembly 18 is constructed from a polymeric material or glass filled material that flexes upon application of a load to the carrier assembly 18. The polymeric material is also substantially resilient, such that the carrier assembly 18 will return to its original formation after many loadings, as well as after prolonged loadings. The thickness of the carrier assembly 18 may vary depending on the desired flexibility.

Referring now to FIG. 2, the carrier assembly 10 generally includes both a seat back carrier 40, as well as a seat carrier 42. The seat back carrier 40 is generally rotatable relative to the seat carrier 42 and is designed to conform to the general shape of a user's back. The seat carrier 42, however, is designed to provide comfort to the buttocks and upper legs of a user during use of the seating assembly 10. Although it is contemplated that the seat carrier 42 and the seat back carrier 40 will be used in combination in any given vehicle 8, it is also contemplated that the seat carrier 42 may be used with a different back support system, and likewise, the seat back carrier 40 may be used with a different seat support system.

Referring now to FIGS. 3-7, the seat back carrier 40 includes a top edge 52, a bottom edge 54, a first side edge 56, and a second side edge 58. The seat back carrier 40 also includes a body portion 60 having first and second side portions 62, 64. The grooves 24 are generally defined by a channel 66 that extends between the first side portion 62 and the body portion 60, and also by a second channel 68 disposed between the second side portion 64 and the body portion 60. The first and second channels 66, 68 are substantially vertically-extending channels that terminate before reaching the top edge 52 or the bottom edge 54. A lateral channel 70 extends between the first and second channels 66, 68. Both the first and second channels 66, 68, as well as the lateral channel 70, include windows 72 substantially equally spaced therealong. The windows 72 allow for increased flexibility in the first channel 66 and the second channel 68, as well as in the lateral channel 70. The windows 72 reduce the overall stiffness of the channels 66, 68, and 70, so that the channels 62, 64, and 70 do not act as stiffening ribs on the seat back carrier 40.

Referring again to FIGS. 3-7, the lateral channel 70, as well as the first and second channels 62, 64, provide space for sewn salvage after a trim cover 80 is installed where different panels of the trim cover 80 are sewn together to form seams 82 (FIG. 7). Without the lateral channel 70, the sewn salvage could be felt through the seat 12 by the upper back of a user. Accordingly, retainer bridges 74 are disposed on a plurality of the windows 72. The molded retainer bridges 74 span across every other window 72 of the lateral channel 70 and are designed to accept clip-on retainers (not shown) that are sewn onto the trim cover 80. The clip-on retainers hold the sewn 82 seams in position and improve the overall comfort and appearance of the seat 12 by securing the sewn salvage in the lateral channel 70. The retainer bridges 74 could also be used with traditional tie-downs to hold the trim cover 80 in the lateral channel 70, as would be understood by one having ordinary skill in the art.

As illustrated in FIGS. 3-7, the apertures 22 of the seat back carrier 40 are tuning stiffness apertures that are intermittently disposed in the body portion 60 of the seat back carrier 40. The tuning stiffness apertures 22 have the affect of allowing additional flexibility of the seat back carrier 40 without compromising substantial structural integrity of the seat back carrier 40. The tuning stiffness apertures 22 also allow for air flow in the seat 12 between the back of a user, the seat back cushion 26, and the seat back carrier 40. The bottom edge 54 of the seat back carrier 40 includes first and second engagement slots 90, 92 designed to interface with engagement members (not shown) that secure the seat back carrier 40 to the frame assembly 16 of the seating assembly 10. In addition, first and second keyhole slots 94, 96 are disposed at a top portion of the seat back carrier 40 and are designed to assist in securing the seat back cushion 26 to the seat back carrier 40. More tuning stiffness apertures 22 may be positioned in the seat back carrier 40 to increase flexibility. Less tuning stiffness apertures 22 may be positioned in the seat back carrier 40 to decrease flexibility. In addition, the size of the tuning stiffness apertures 22 may be changed to provide more or less apertures 22 to the seat back carrier 40. A rear cover 97 is positioned behind the seat back carrier 40 to protect and hide the seat back carrier 40.

Referring now to FIGS. 8-11, the illustrated embodiment of seat carrier 42 includes a body portion 100 having first and second side portions 102, 104. A first channel 106 is defined between the first side portion 102 and the body portion 100, and a second channel 108 is defined between the second side portion 104 and the body portion 100. Each of the first and second channels 106, 108 include a plurality of windows 109 that give the seat carrier 42 additional flexibility. The windows 109 prevent the first and second channels 106, 108 from acting as stiffening ribs in the seat carrier 42. A plurality of support tabs 20 are disposed in the body portion 100 and are integral therewith. The support tabs 20 are flexible and are designed to deflect upon the addition of a load, such as the buttocks of a user, to the seat carrier 42. It is contemplated that any number of support tabs 20 may be disposed in the body portion 100 of the seat carrier 42. In the illustrated embodiment, a plurality of support tabs 20 are disposed at a forward area 110 and are longitudinally aligned. Additionally, a plurality of elongate support tabs 20 are disposed in a rearward area 112 and are laterally aligned. The laterally aligned tabs extend inward from the first and second side portions 102, 104. The tabs 20 include a distal end 114 and a base 116. The base 116 connects with the body portion 100 of the seat carrier 42.

Referring again to the embodiment illustrated in FIGS. 8-11, the seat carrier 42 also includes a rim 120. The rim 120 includes a plurality of rim slots 122 that provide additional flexibility to the seat carrier 42. The rim slots 122 generally define vertical rim columns 123 in the rim 120 of the seat 12. The tall vertical rim 120, as illustrated, provides a seat 12 that is substantially stiff and hard, which is especially evident when a user is entering or exiting the seat 12. The rim slots 122 reduce the overall thickness of the seat carrier 42, allowing it to flex. It is contemplated that the number and size of the rim slots 122 can be adjusted to tune the stiffness of the outer rim 120. In the illustrated embodiment, the rim slots 122 are predominantly shown on first and second sides 124, 126 of the seat carrier 42, while only a few rim slots 122 are disposed on a front side 128 and none are shown on a back side 130 of the seat carrier 42. However, it is contemplated that any number of slots 122 may be disposed on the first and second sides 124, 126, front side 128, or back side 130 of the rim 120. The rim slots 122 include a top keyhole portion 132 that allows controlled flexibility and minimizes the likelihood of cracking or breaking where the rim slot 122 terminates.

Figure 11:
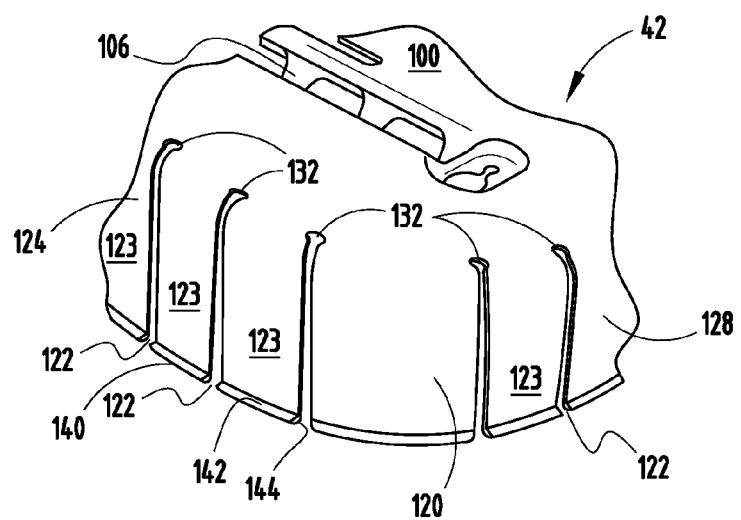
FIG. 11 is a top perspective of a corner portion of a seat carrier.
Figure 12:
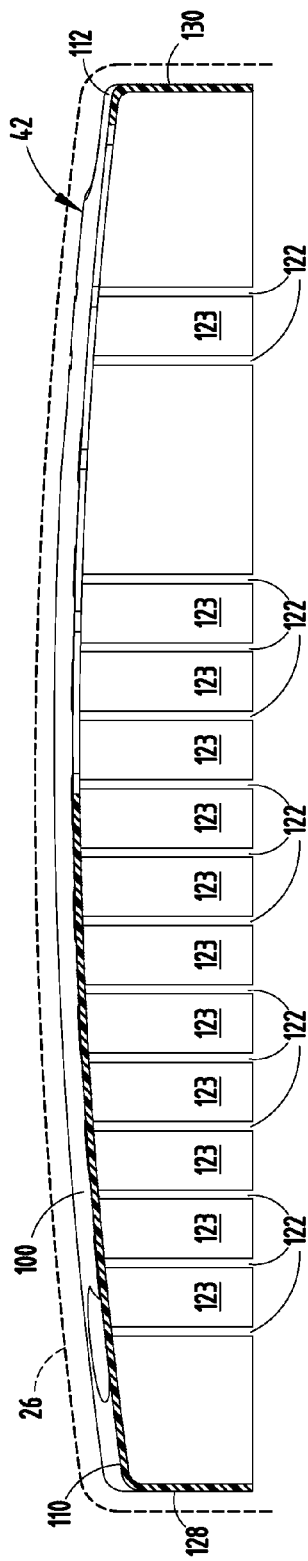
FIG. 12 is a side elevational view of the seat carrier taken at line XII-XII of FIG. 2.

As shown in the embodiment illustrated in FIG. 11, a bottom edge of each rim column 123 of the rim 120 includes a soft trim edge attachment portion 140. The soft trim edge attachment portion 140 allows the soft trim cover 80 to be attached to the seat carrier 42 during assembly of the seating assembly 10. To affect attachment of the soft trim cover 80 to the seat carrier 42, a retainer clip (not shown) is sewn to the soft trim cover 80 and the retainer clip is then connected with the soft trim edge attachment portion 140 of the rim column 123. The shape of the soft trim edge attachment portion 140 is designed to accommodate the retainer clip, thus securing the soft trim cover 80 to the seat carrier 42. The soft trim edge attachment portion 140 has a planar top portion 142 and an arcuate bottom portion 144. It is contemplated that other retainer designs could also be incorporated to accommodate different trim retainers and to retain trim covers 80 of varying sizes and thicknesses.

Figure 13:
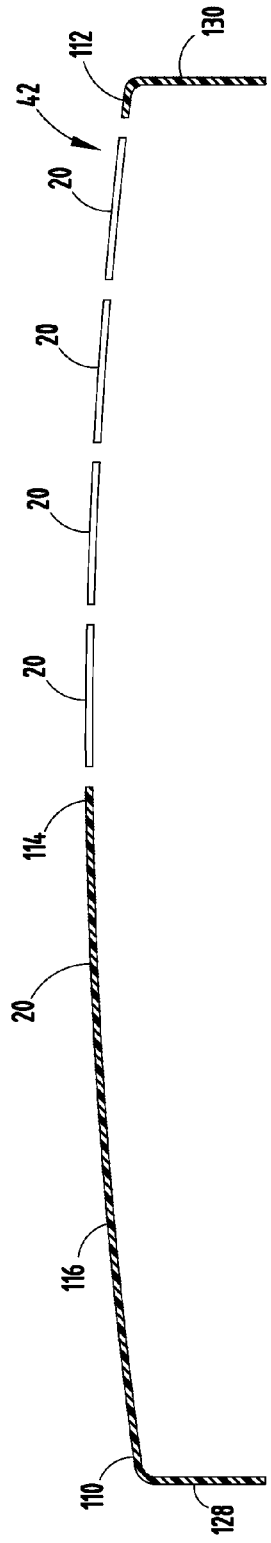
FIG. 13 is a side elevational view of the seat carrier of FIG. 12 without a distributed load placed on the seat carrier.
Figure 13A:
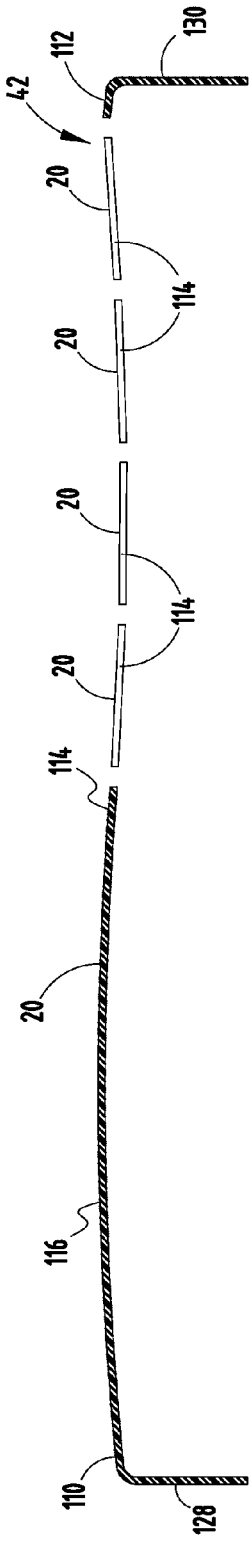
FIG. 13A is a side elevational view of the seat carrier of FIG. 12 with a distributed load placed on the seat carrier.

Referring now to FIGS. 12-15, the seat carrier 42 is designed to gently cushion a user in a seated position. To create a comfortable seating surface, the support tabs 20 flex downward (FIG. 13A) under application of a load, such as the weight of a user, and generally conform to the shape of the buttocks of a user. Specifically, the support tabs 20 disposed at the forward area 110 of the seat carrier 42 flex downward at varying degrees across the seat 12. At the same time, when the load is applied, the elongate support tabs 20 disposed in the rearward area 112, and which are laterally aligned, flex downwardly to conform to the shape of the buttocks of the user. Consequently, opposing support tabs 20 flex away from one another (FIG. 15). It is contemplated that the support tabs 20 will flex varying degrees, depending on the shape of a user's buttocks and the degree of flexibility of the support tabs 20.

Referring now to FIGS. 16-18, as indicated above, the seat carrier 42 also flexes at the rim 120. Specifically, the rim slots 122 are designed to flex and spread or come together to conform to the shape of the buttocks of a user when a load is applied, such as the body weight of a user. FIG. 16 illustrates the seat carrier 42 in an unflexed or unloaded condition. FIGS. 17 and 18 illustrate the seat carrier 42 in a flexed or loaded condition, wherein the weight of a user is distributed across the seat carrier 42. To conform to the shape of the buttocks of a user, the seat carrier 42 flexes, such that some of the rim slots 122 spread and some of the rims slots 122 come together. The cushion 26 disposed on the seat back carrier 40 and the seat carrier 42 is also very stretchable and resilient to accommodate the varying degrees of flex of the seat back carrier 40 and the seat carrier 42.

It should be understood that the various channels, apertures, and slots disclosed above with regard to the seat back carrier 40, as well as the seat carrier 42, may be formed by cutting these respective items into the seat back carrier 40 or the seat carrier 42. Alternatively, the seat back carrier 40 or the seat back carrier 42 may be molded to include these formations. The seat back carrier 40 and the seat back carrier 42 are generally designed to provide a single unitary member made of a rigid material, yet having flexible properties by way of the channels, apertures, and slots disposed in the seat back carrier 40 and the seat carrier 42. The unitary construction of the seat back carrier 40 and the seat back carrier 42 provides a simple, yet effective, load carrying member that, when installed in a vehicle, provides a comfortable seating arrangement adapted for long use. It will be understood by one having ordinary skill in the art that features disposed on the seat back carrier 40 may also be utilized on the seat carrier 42. Similarly, features that are shown and described as being on the seat carrier 42 may be incorporated onto the seat back carrier 40.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly comprising:
   a seat;
   a seat back;
      a seat carrier proximate the seat and comprising:
         a first channel with a plurality of windows adjacent a first side of the seat;
         a second channel with a plurality of windows adjacent a second side of the seat;
         first and second sets of inwardly-directed elongate support tabs disposed between the first and second channels;
         a third set of rearwardly-extending support tabs; and
         a rim extending around the seat carrier and having a plurality of rim slots; and
      a cushion extending over the seat.

2. The seating assembly of claim 1, wherein the seat carrier includes first and second rear corners with rear corner recesses.

3. The seating assembly of claim 1, wherein each of the rim slots includes a top keyhole portion.

4. The seating assembly of claim 1, further comprising:
   a soft trim edge attachment disposed at a bottom end of each rim slot.

5. The seating assembly of claim 4, wherein the soft trim edge attachment includes a planar top portion.

6. The seating assembly of claim 5, wherein the soft trim edge attachment includes an arcuate bottom portion.

7. The seating assembly of claim 1, wherein a forward end of each of the first and second channels includes a fastening feature.

8. A seat back carrier comprising:
   a body portion having a first vertical channel defining a plurality of distinct windows, and a second vertical channel defining a plurality of distinct windows;
   a lateral channel extending across the body portion and defining a plurality of distinct windows with retainer bridges;
   first and second keyhole slots disposed at a top portion of the body portion;
   a plurality of tuning stiffness apertures; and
   first and second lower engagement slots.

9. The seat back carrier of claim 8, further comprising:
   a seat back cushion extending over the body portion.

10. The seat back carrier of claim 8, wherein the plurality of tuning stiffness apertures extend above and below the lateral channel.

11. A seat carrier comprising:
    a body having first and second recessed channels;
    first and second sets of opposing cushion tabs disposed in and integral with the body portion; and
    a plurality of edge stiffness tuning slots disposed in first and second side portions of the body, each slot including a top keyhole portion, the slots defining vertical rim columns that include outwardly-extending soft trim edge attachments.

12. The seat carrier of claim 11, wherein the first and second sets of opposing cushion tabs include longitudinally-aligned tabs at a forward area of the body and laterally-aligned tabs at a rearward area of the body.

* * * * *